United States Patent
Summa et al.

(10) Patent No.: US 12,121,799 B2
(45) Date of Patent: Oct. 22, 2024

(54) CONTEXTUAL ADJUSTMENT OF INPUT DEVICE RESISTANCE

(71) Applicant: Dell Products L.P., Round Rock, TX (US)

(72) Inventors: Erik Summa, Austin, TX (US); Jason Scott Morrison, Chadron, NE (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/647,850

(22) Filed: Jan. 13, 2022

(65) Prior Publication Data

US 2023/0218985 A1 Jul. 13, 2023

(51) Int. Cl.
*A63F 13/22* (2014.01)
*A63F 13/24* (2014.01)
*A63F 13/837* (2014.01)
*G06F 3/0338* (2013.01)

(52) U.S. Cl.
CPC .............. *A63F 13/22* (2014.09); *A63F 13/24* (2014.09); *A63F 13/837* (2014.09); *G06F 3/0338* (2013.01); *A63F 2300/1018* (2013.01); *A63F 2300/1043* (2013.01); *A63F 2300/8076* (2013.01)

(58) Field of Classification Search
CPC ........ A63F 13/22; A63F 13/24; A63F 13/837; A63F 2300/1018; A63F 2300/1043; A63F 2300/8076; G06F 3/0338
See application file for complete search history.

(56) References Cited

U.S. PATENT DOCUMENTS

| | | | | |
|---|---|---|---|---|
| 5,436,640 A | * | 7/1995 | Reeves | G05G 9/047 345/161 |
| 5,691,898 A | * | 11/1997 | Rosenberg | A63F 13/23 345/161 |
| 6,004,134 A | * | 12/1999 | Marcus | G05G 9/047 434/45 |
| 6,400,352 B1 | * | 6/2002 | Bruneau | G05G 9/047 345/161 |
| 6,437,771 B1 | * | 8/2002 | Rosenberg | A63F 13/245 345/161 |

(Continued)

OTHER PUBLICATIONS

Shim et al. 2020. FS-Pad: Video Game Interactions Using Force Feedback Gamepad. In Proceedings of the 33rd Annual ACM Symposium on User Interface Software and Technology (UIST '20). Association for Computing Machinery, New York, NY, USA, 938-950. <URL: https://doi.org/10.1145/3379337.3415850> (Year: 2020).*

*Primary Examiner* — Justin L Myhr
*Assistant Examiner* — Carl V Larsen
(74) *Attorney, Agent, or Firm* — Norton Rose Fulbright US LLP (57) ABSTRACT

A method for adjusting input resistance includes determining, by an information handling system, one or more gaming context characteristics of a gaming application executed by the information handling system. The information handling system determines one or more adjustments to a resistance of a two-axis input device based, at least in part, on the one or more gaming context characteristics. The information handling system applies the one or more adjustments to the resistance of the two-axis input device.

18 Claims, 8 Drawing Sheets

(56) References Cited

U.S. PATENT DOCUMENTS

| | | | | |
|---|---|---|---|---|
| 6,573,885 B1* | 6/2003 | McVicar | F16D 3/382 | 345/161 |
| 7,061,466 B1* | 6/2006 | Moore | F16F 15/03 | 345/161 |
| 8,496,528 B2* | 7/2013 | Muramatsu | A63F 13/24 | 463/37 |
| 9,501,084 B1* | 11/2016 | Bannister | G05G 9/047 | |
| 9,557,830 B2* | 1/2017 | Grant | A63F 13/00 | |
| 9,931,567 B2* | 4/2018 | Tiffany | G05G 5/05 | |
| 9,943,757 B2* | 4/2018 | Tiffany | G05G 5/05 | |
| 10,675,532 B2* | 6/2020 | Soelberg | G06F 3/03543 | |
| 11,353,966 B1* | 6/2022 | Ebert | G06T 19/006 | |
| 2005/0124416 A1* | 6/2005 | Hammond | G06F 3/0202 | 463/37 |
| 2005/0222499 A1* | 10/2005 | Banik | A61B 1/0676 | 600/156 |
| 2008/0004114 A1* | 1/2008 | McVicar | A63F 13/285 | 463/37 |
| 2010/0025539 A1* | 2/2010 | Hanlon | G05G 9/047 | 74/508 |
| 2010/0071496 A1* | 3/2010 | Hanlon | G05G 9/047 | 74/471 XY |
| 2011/0281651 A1* | 11/2011 | Lin | A63F 13/285 | 463/37 |
| 2013/0162419 A1* | 6/2013 | Chang | A63F 13/24 | 340/407.2 |
| 2014/0094310 A1* | 4/2014 | Bleich | G07F 17/3209 | 463/38 |
| 2015/0029101 A1* | 1/2015 | Shin | G06F 1/169 | 345/161 |
| 2016/0175711 A1* | 6/2016 | Billington | G08B 6/00 | 340/407.2 |
| 2017/0361221 A1* | 12/2017 | Bailey | A63F 13/24 | |
| 2017/0368451 A1* | 12/2017 | Tiffany | A63F 13/22 | |
| 2018/0345134 A1* | 12/2018 | Schmitz | G06F 3/016 | |
| 2018/0345135 A1* | 12/2018 | Schmitz | G06F 3/0338 | |
| 2019/0286237 A1* | 9/2019 | Eck | G06F 3/0338 | |
| 2020/0012357 A1* | 1/2020 | Lien | G06F 3/0362 | |
| 2020/0080574 A1* | 3/2020 | Slightam | F15B 11/20 | |
| 2022/0134220 A1* | 5/2022 | Dang | A63F 13/92 | 463/37 |
| 2022/0283602 A1* | 9/2022 | Battlogg | F16H 59/02 | |
| 2022/0404855 A1* | 12/2022 | Spink | G05G 5/03 | |
| 2023/0085053 A1* | 3/2023 | Young | A63F 13/22 | 463/4 |
| 2024/0083569 A1* | 3/2024 | Delbos | F16H 55/14 | |

* cited by examiner

CONTEXTUAL ADJUSTMENT OF INPUT DEVICE RESISTANCE

FIELD OF THE DISCLOSURE

The present disclosure generally relates to information handling systems, and more particularly relates to input devices for information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems may be used in a variety of contexts. For example, personal computers may be used by a user at a desk or on a couch. Gaming consoles and televisions may be used while seated in a chair or while standing. A virtual or augmented reality system may be used by a user while seated or while standing and mobile.

A variety of input devices may be used to enter and manipulate information using information handling systems across a wide variety of usage scenarios. Such input devices may include keyboards for text input, game controllers for gaming or other input, trackpads, trackballs, and computer mice for cursor control, microphones for voice input, cameras for image and video input, motion controllers for gesture and other motion input, and other input devices. One common pairing of input devices for manipulation of information by users is a computer mouse for cursor control and a keyboard for text input. Use of a keyboard and mouse for information handling system control may provide enhanced accuracy and control when gaming as compared to other input methods. For example, use of a mouse when playing a first-person shooter (FPS) game may provide greater accuracy than use of a gaming controller or other input device. However, use of a mouse and keyboard may be limited to a desktop or seated environment.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A resistance of a two-axis input device for an information handling system, such as a joystick or a trackball, may be adjusted based on gaming context characteristics of a gaming application executed by an information handling system. For example, a resistance of a two-axis input device may be adjusted based on a gaming application executed by the information handling system, a user profile of a user playing a game using the information handling system, events that occur within the gaming application, such as a user triggering an enhanced aim function in a first person shooter, and other gaming context characteristics. Adjustments to the resistance of the two-axis input device may limit movement of the two-axis input device to movement along a single access, adjust hold and stop positions of the two-axis input device, adjust a variable resistance field of the two-axis input device, such as increasing resistance at a predetermined rate as the two-axis input device moves further from a default or home position, adjusting position holds on the two-axis input device, and adjusting haptic patterns of the two-axis input device. Adjustments to resistance of a two-axis input device may be achieved by, for example, adjusting a tension on a centering spring of the two-axis input device and adjusting a friction applied to one or both axes the two-axis input device. Such adjustments may provide enhanced accuracy using the two-axis input device and enhanced immersion through use of haptic feedback, improving a user experience.

A method for adjusting input resistance of a two-axis input device may include determining, by the information handling system, one or more gaming context characteristics of a gaming application executed by the information handling system. Such a determination may include receiving an indication of one or more gaming context characteristics of a gaming application from a remote information handling system, such as a cloud-based service. Alternatively or additionally, the information handling system itself may monitor and/or analyze gaming data of a gaming application executed by the information handling system to determine gaming context characteristics. Such characteristics may, for example, include an identity of the gaming application, a genre of the gaming application, a profile of a user operating the information handling system, or a game state information of the application. A game state information of the application may include one or more events that have occurred in or related to the gaming application, such as a user entering an aiming mode in a first person shooter, entering a specific area or level of the gaming application, moving a cursor or viewpoint of the gaming application to a particular area of a display of the information handling system, moving a two-axis input device a predetermined amount from a hold point, such as a starting or resting point, of the two-axis input device, other adjustments to the two-axis input device, equipping of a particular weapon in the gaming application, abilities or traits obtained in the gaming application, effects, such as status ailments, in the gaming application, a character state in the gaming application, a weapon/item state in the gaming application, cooldowns in the gaming application, terrain effects in the gaming application, a vehicle state in the gaming application, a user selection in the gaming application, one or more user attention vectors, attributes of in-game objects in the gaming application, and other game state information.

The information handling system may determine one or more adjustments to a resistance of a two-axis input device based, at least in part, on the one or more gaming context characteristics. A two-axis input device may receive input from a user along a first axis, such as an x-axis, a second axis, such as a y-axis, or a combination of the first and second axes. Examples of two-axis input devices may include a trackball, a joystick, and a control stick. For example, thumbsticks of a gaming controller are examples of two-axis input devices. Adjustments to a resistance of a two-axis input device may make it more or less difficult to move the two-axis input device, such as to rotate a trackball or to push a joystick in a direction. For example, adjustments to a resistance of a two-axis input device may include adjustments to one or more hold positions of the two-axis input device, such as adjustments to a starting or resting position of a joystick. Adjustments to a resistance of a two-axis input device may include adjustments to one or more stop positions of the two-axis input device, such as positions beyond which the two-axis input device may not be moved, or may be more difficult to move. Adjustments to a resistance of a two-axis input device may include adjustments to a variable resistance field profile of the two-axis input device, such as adjusting the variable resistance field profile to include increasing a resistance of the two-axis input device as the two-axis input device is moved further from a hold position. For example, a resistance of a two-axis input device may be gradually increased as the two-axis input device is moved further from its initial or resting position or may be increased or decreased based on a speed at which a user adjusts an input via the two-axis input device. As another example, adjustments to a resistance of a two-axis input device may include adjusting resistance based on display information of the information handling system, such as based on an area of a display of the information handling system where a cursor or aiming point is located. For example, a resistance of the two-axis input device may be increased as the cursor gets closer to an edge of the display. Adjustments to a resistance of a two-axis input device may include adjustments to haptic patterns of the two-axis input device, such as variations in resistance over time and/or in response to user actions. For example, the information handling system may quickly increase and decrease a resistance of the two-axis input device to provide haptic feedback to the user.

As one example, determining one or more gaming context characteristics may include determining that the gaming application is a first-person shooter gaming application and determining that a user of the information handling system has activated a trigger to activate an aiming function in the gaming application. Determining the one or more adjustments to the resistance of the two-axis input device based on the determined gaming context characteristics may include determining to increase a resistance of the two-axis input device while the trigger is activated.

The determination of the one or more adjustments to a resistance of the two-axis input device may include receiving instructions to perform such adjustments from a remote information handling system, such as from a cloud-based service. In some embodiments, the determination of the one or more adjustments may be performed by a rules engine executed by the information handling system, by a complex event processing system executed by the information handling system, by a machine learning model executed by the information handling system, or by a reinforcement learning model executed by the information handling system.

The information handling system may apply the one or more adjustments to the resistance of the two-axis input device. For example, the information handling system may transmit instructions to a controller including the two-axis input device to adjust the resistance of the two-axis input device. Application of such adjustments may include activating a motor of the two-axis input device to adjust a tension on a spring of the two-axis input device. Alternatively or additionally, such adjustments may include activating a motor of the two-axis input device to adjust an internal friction of the two-axis input device, such as by adjusting one or more pressure applicators in contact with one or more axes of a two-axis gimbal of the two-axis input device.

A hand-held input device may include a body and a two-axis input device. The two-axis input device may include a motor for adjusting a resistance of the two-axis input device. The two-axis input device may further include a spring. The motor, when activated, may adjust a resistance of the two-axis input device by adjusting a tension, such as a preload tension, on the spring. For example, the motor may raise or lower a base of the spring to adjust the tension on the spring. The spring may, for example, be a piston centering spring, positioned to return a control stick of the two-axis input device to a default upright position when force is not applied to the control stick by a user. The two-axis input device may include a gearbox coupled to the motor and the floor of the spring. The motor may adjust the preload tension on the spring by raising and lowering the floor of the spring using the gearbox. Alternatively or additionally, the motor may adjust the resistance of the two-axis input device by adjusting a friction applied to the two-axis input device. For example, one or more motors of the two-axis input device may drive one or more pressure applicators, such as screws, to increase or reduce friction between the pressure applicators and one or more movable components of the two-axis input device, such as one or more axes of a two-axis gimbal of the two-axis input device.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, handheld gaming system, console gaming system, hybrid gaming system, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
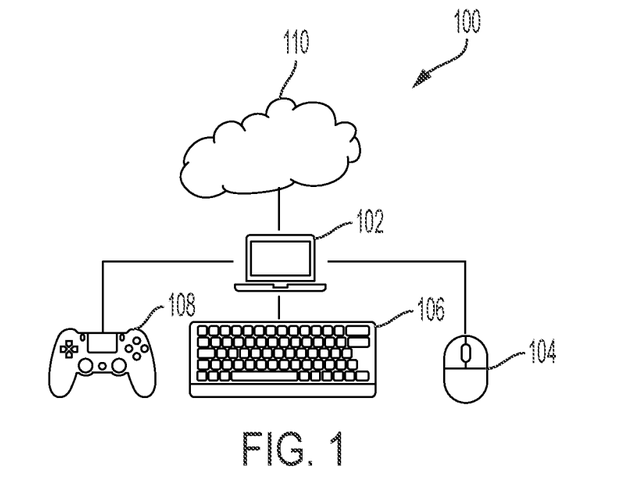
FIG. 1 is a diagram of an information handling system and a plurality of input devices according to some embodiments of the disclosure.

A variety of input devices may be used to input information into and manipulate information using information handling systems. Such input devices may include handheld gaming controllers, keyboards, computer mice, trackpads, trackballs, microphones, cameras, and other input devices. An example system 100 including an information handling system 102, a plurality of input devices 104-108, and a cloud connection 110 is shown in FIG. 1. The information handling system 102 may, for example, be a desktop computer, a laptop computer, a smart phone, a tablet, a handheld or console gaming system, or other information handling system. The information handling system 102 may be used to execute a variety of applications, such as gaming applications. For example, a user may play FPS, strategy, platforming, multiplayer, role playing, and other games using the information handling system 102. A variety of input devices may be used with the information handling system. For example, a mouse 104 may be used to receive user input to control a cursor on a display of the information handling system, or to provide view control in a gaming application. A keyboard 106 may also be used to receive user input, such as to control one or more aspects of a gaming application. Alternatively or additionally, a game controller 108 may be used to receive user input to control gaming applications executed by the information handling system 102. Other input devices, such as trackballs, trackpads, touch screens, and other input devices may be connected to the information handling system 102 to receive input from a user. In some embodiments, input devices may be connected to the information handling system 102 via a wired connection or a wireless connection. In some embodiments, such as in handheld gaming systems, tablets, and smart phones, input devices may be integrated into an information handling system itself.

Different input devices may provide different advantages and disadvantages to a user when playing games using information handling system 102. For example, mouse 104 and keyboard 106 may provide enhanced accuracy and control, such as when aiming in a FPS game or selecting objects in a strategy or role playing game. The contexts in which a mouse 104 and a keyboard 106 may be used, however, may be limited. For example, a mouse 106 and keyboard 106 may be limited to a desktop environment, where a user is seated or standing at a desk and may not be practical for use when away from a desk, such as when the user is seated on a couch or in a chair without a desk surface, in bed, outdoors, or traveling. Other input devices, such as touch screens and game controllers 108 may be useful in a wider variety of usage contexts, but may not provide the same level of accuracy and control provided by the mouse 104 and keyboard 106. For example, a game controller 108 may include one or more two-axis input devices that, while providing a degree of accuracy and control, do not provide the same level of accuracy or control as a keyboard 106 and mouse 104. Two-axis input devices may, for example, include input devices configured to receive input along a first axis, such as an x-axis, a second axis, such as a y-axis, and a combination of the first and second axes. For example, a joystick, such as a thumbstick, may receive user input via a user moving the joystick from a default position along one or more axis. As another example, a trackball may be rotated by a user in one or more directions and the speed and direction of rotation may be received by the information handling system 102 as input from the user.

Accuracy and immersion of a user of a two-axis input device, such as a joystick or trackball of a gaming controller 108 may be enhanced through control of a resistance of the two-axis input device by the information handling system 102. For example, the information handling system 102 may adjust the resistance of the two-axis input device based on one or more gaming context characteristics of a gaming application executed by the information handling system. Gaming context characteristics may, for example, include an identity of the gaming application, a genre of the gaming application, a profile of a user operating the information handling system, or a game state information of the application. Game state information of the application may include one or more events that have occurred in or related to the gaming application, such as a user entering an aiming mode in a first person shooter, entering a specific area or level of the gaming application, moving a cursor or viewpoint of the gaming application to a particular area of a display of the information handling system, moving a two-axis input device a predetermined amount from a hold point, such as a starting or resting point, of the two-axis input device, other adjustments to the two-axis input device, equipping of a particular weapon in the gaming application, abilities or traits obtained in the gaming application, effects in the gaming application, a character state in the gaming application, a weapon/item state in the gaming application, cooldowns in the gaming application, terrain effects in the gaming application, a vehicle state in the gaming application, a user selection in the gaming application, one or more user attention vectors, attributes of in-game objects in the gaming application, and other game state information.

In some embodiments, the information handling system 102 may monitor a gaming application executed by the information handling system 102, such as monitoring video content, user input, audio content, or other information of the gaming application, to detect game state information, such as game events, as described in U.S. Pat. No. 11,141,658 to Cox et al. and entitled "GAMEPLAY EVENT DETECTION AND GAMEPLAY ENHANCEMENT OPERATIONS," which is hereby incorporated by reference. Such monitoring and analysis may be performed by the information handling system 102 or by a remote information handling system in the cloud 110, such as a cloud-based server. For example, in some embodiments, the information handling system 102 will transmit data related to the gaming application to the cloud 110 for analysis, and may receive information regarding game state information, such as game events, and/or information regarding adjustments that should be made to a resistance of a two-axis input device connected to the information handling system based on determined game state information, such as game events. Thus, the information handling system 102 may adjust a resistance of a two-axis input device based on gaming context characteristics.

Figure 2A:
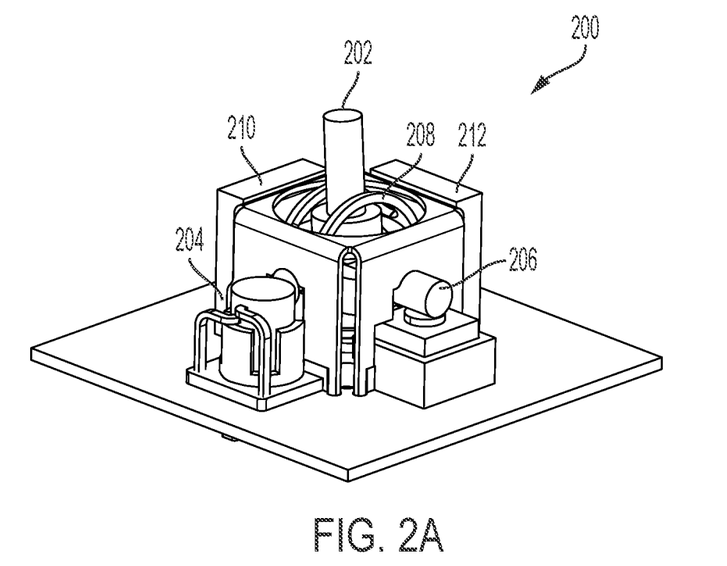
FIG. 2A is a perspective view of a two-axis input device including a motor for adjusting a tension of a spring of the two-axis input device according to some embodiments of the disclosure.

An example two-axis input device 200, such as a joystick, for an information handling system is shown in FIG. 2A.

The two-axis input device 200 may include a control stick 202 that may be moved along two axes, or a combination of the two axes in any direction about a hold position of the control stick 202, such as a resting or default position. For example, the stick 202 may be pulled toward a user, pushed away from the user, moved from right to left or left to right, or moved at an angle respective to the user. The two-axis input device 202 may, for example, be housed in a gaming controller. In some embodiments, a gaming controller may house multiple two-axis input devices. The two-axis input device 202 may receive input from a user, such as input to control a cursor on a display of an information handling system, input to control a view displayed on the display of the information handling system, input to control aim in a gaming application executed by the information handling system, or other two-axis input. The two-axis input device may, for example, include a first stabilizer 210 connected to a first axis 206. The two-axis input device may include a second stabilizer 212 connected to a second axis 208. For example, the first axis 206 and the second axis 208, along with the first stabilizer 210 and the second stabilizer 212, may form a two-axis gimbal, allowing the user to adjust the position of the control stick 202 in any direction along the two axes or combinations of the two axes. The first and second pivots may allow the user to move the control stick 202 in any direction outward from the center position shown in FIG. 2A.

The two-axis input device 200 may include a first motor 204, such as a micro stepper motor, to adjust a resistance of the two-axis input device 200. For example, activation of the motor 204 may adjust an amount of force the user must exert to move the control stick 202. In some embodiments, such adjustments may adjust one or more stop positions of the two-axis input device 200, such as one or more positions beyond which the control stick 202 may not be moved or may be difficult to move. As another example, such adjustments may include adjustments to a variable resistance field profile of the two-axis input device 200, such as an amount of force required to move the control stick 202 in certain ways. For example, an amount of force required to move the control stick 202 may be increased gradually or exponentially as the control stick 202 is moved further from a default position. As another example, the control stick 202 may be limited to only allow movement in a certain direction or set of directions, such as movement only along a certain axis. Adjustments to the resistance of the two-axis input device 200 may also include adjustments to position holds of the two-axis input device 200, such as adjustments to a default or resting position of the control stick 202. For example, a resting position of the control stick 202 may be adjusted to maintain the control stick 202 closer to the motor 204 than its current resting position, shown in FIG. 2A. Adjustments to the resistance of the two-axis input device 200 may also include adjustments to one or more haptic patterns of the two-axis input device 200. For example, the motor 204 may be operated to rapidly increase and decrease an amount of force required to adjust the position of the control stick 202, generating haptic feedback. The first motor 204 may, for example, be an actuator, such as a servo or step-up motor, to allow for constant adjustment to the resistance of the two-axis input device based on continuous determination of gaming context characteristics.

Figure 2B:
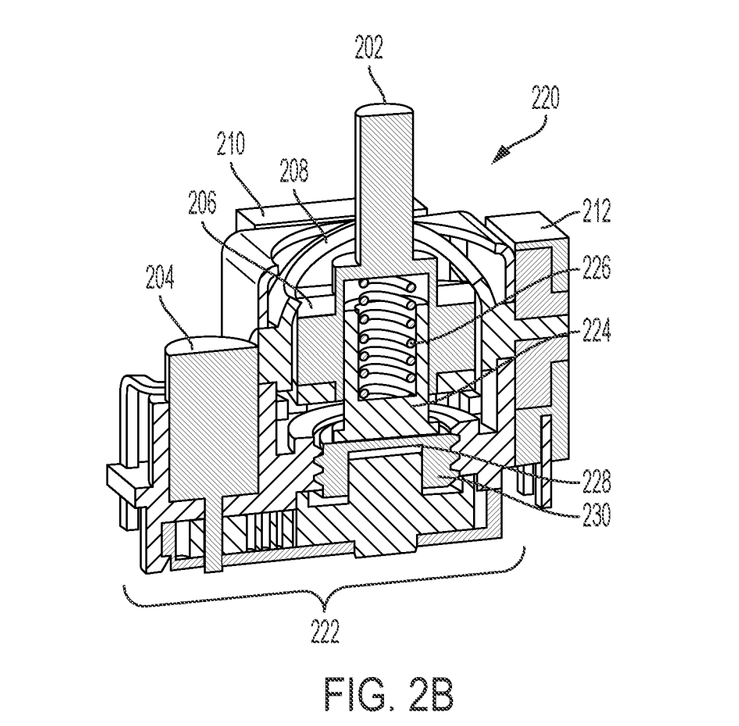
FIG. 2B is a perspective view of a cross-section of a two-axis input device including a motor for adjusting a tension of a spring of the two-axis input device according to some embodiments of the disclosure.

The motor 204 may adjust the resistance of the two-axis input device 200 by adjusting a tension, such as a preload tension on a spring, such as a centering spring, of the two-axis input device 200. An example cross-section view 220 of the two-axis input device 200 of FIG. 2A is shown in FIG. 2B. As shown in FIG. 2B, activation of the motor 204 may cause gears within a gearbox 222 to rotate a spring floor 230. A body of the spring floor 230 may be threaded such that, when rotated the spring floor 230 thread in or out of a housing to rise upward or descend downward. The spring floor 230 and a gear of the gearbox 222 may meet at a translational joint 228. A spring 226, such as a centering piston spring, may be housed in a piston housing 224. A base of the piston housing 224 may be in contact with the spring floor 230, such that when the spring floor 230 is raised the spring 226 is compressed, and when the spring floor 230 is lowered the spring 226 is extended. Thus, raising or lowering a spring floor 230 may decrease or increase a tension on the spring 226, thereby increasing and decreasing a resistance of the two-axis input device. Raising the floor 230 may decrease a tension of the spring 226, while lowering a floor 230 may increase a tension on the spring 226. Thus, the resistance of the two-axis input device 200 may be adjusted using the motor 204 to raise and lower a spring floor 230.

Figure 2C:
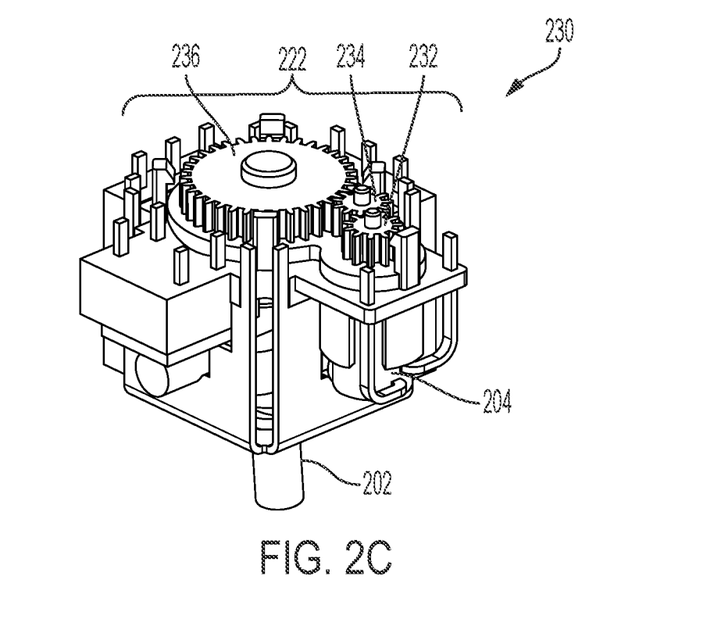
FIG. 2C is a perspective view of a two-axis input device including a gearbox for adjusting a tension of a spring of the two-axis input device according to some embodiments of the disclosure.

An example perspective view of a gearbox 222 the two-axis input device 200, shown in FIG. 2A, is shown in FIG. 2C. As shown in FIG. 2C, the gearbox 222 may include a first gear 232 driven directly by the motor 204. Rotation of the first gear 232 may cause a second gear 234 to rotate. Rotation of the second gear 234 may cause a third gear 236 to rotate, and rotation of the third gear 236 may cause the spring floor 230 shown in FIG. 2B to rise or descend, compressing or extending the spring 226.

In some embodiments, one or more motors, such as step-up motors, servos, or other actuators, may be used to increase or decrease a friction on one or more axes of the two-axis input device. An example two-axis input device 300, shown in FIG. 3A may include a control stick 310 used by a user to input control information for the information handling system similar to the control stick 202 of FIG. 2A. The two-axis input device 300 may, for example, include first and second axes as described and shown with respect to the two-axis input device of FIGS. 2A-C. The two-axis input device 300 may have a first pressure applicator 302, such as a screw, for applying pressure to increase a friction of a first axis of the two-axis input device 300 via access point 312. Such an increase in friction may increase a resistance of the two-axis input device 300 to movement along the first axis, thereby increasing an amount of force required from a user to move the joystick 310 along the first axis. Similarly, the two-axis input device 300 may include a second pressure applicator 306, such as a screw, for applying pressure to increase a friction of a second axis of the two-axis input device 300 via an access point 314. Such an increase in friction may increase a resistance of the two-axis input device 300 along the second axis, thereby increasing an amount of force required to move the joystick 310 along the second axis. In some embodiments, a first motor 304, such as a first servo motor, step-up motor, or other actuator, may be included in the first input device 300 to increase or reduce an amount of friction applied to the first axis. For example, the first motor 304 may be activated by the information handling system to adjust the pressure applicator 302 to apply more or less friction to the first axis, such as by rotating a screw to tighten or loosen the screw. Similarly, a second motor 308, such as a second servo motor or a second actuator, may be included in the first input device 300 to increase or reduce an amount of friction applied to the second axis. For example, the second motor 308 may be activated by the information handling system to adjust the pressure applicator 306 to apply more or less friction to the second axis, such as by rotating a screw to tighten or loosen the screw. The pressure applicators 302, 306 may thus adjust a friction of each axis of the two-axis gimbal of the two-axis input device 300 by using a clamping mechanism to increase or reduce friction.

Adjustment of friction along the axis of the two-axis input device 300 may allow various adjustments to a resistance of the device 300. For example, activation of one or both of the motors 304, 308 may allow for adjustment to an amount of force the user must exert to move the control stick 310. In some embodiments, such adjustments may adjust one or more stop positions of the two-axis input device 300, such as one or more positions beyond which the control stick 310 may not be moved or may be difficult to move. For example, friction may be increased along an axis as a controller approaches such a point, to prevent or inhibit the control stick from being moved beyond that point. As another example, such adjustments may include adjustments to a variable resistance field profile of the two-axis input device 300, such as an amount of force required to move the control stick 310 in certain ways. For example, an amount of force required to move the control stick 300 may be increased gradually or exponentially as the control stick 310 is moved further from a default position by increasing a friction on one or both axes of the two-axis input device 300. As another example, the control stick 310 may be limited to only allow movement in a certain direction or set of directions, such as movement only along a certain axis by increasing friction to a high level along another axis. Adjustments to the resistance of the two-axis input device 300 may also include adjustments to position holds of the two-axis input device 300, such as adjustments to a default or resting position of the control stick 310. For example, a resting position of the control stick 310 may be adjusted to maintain the control stick 310 closer to the motor 308 than to its current resting position, shown in FIG. 3A. Adjustments to the resistance of the two-axis input device 300 may also include adjustments to one or more haptic patterns of the two-axis input device 300. For example, the motors 304, 308 may be operated to rapidly increase and decrease an amount of friction applied to the axes of the input device 300, generating haptic feedback.

Figure 3A:
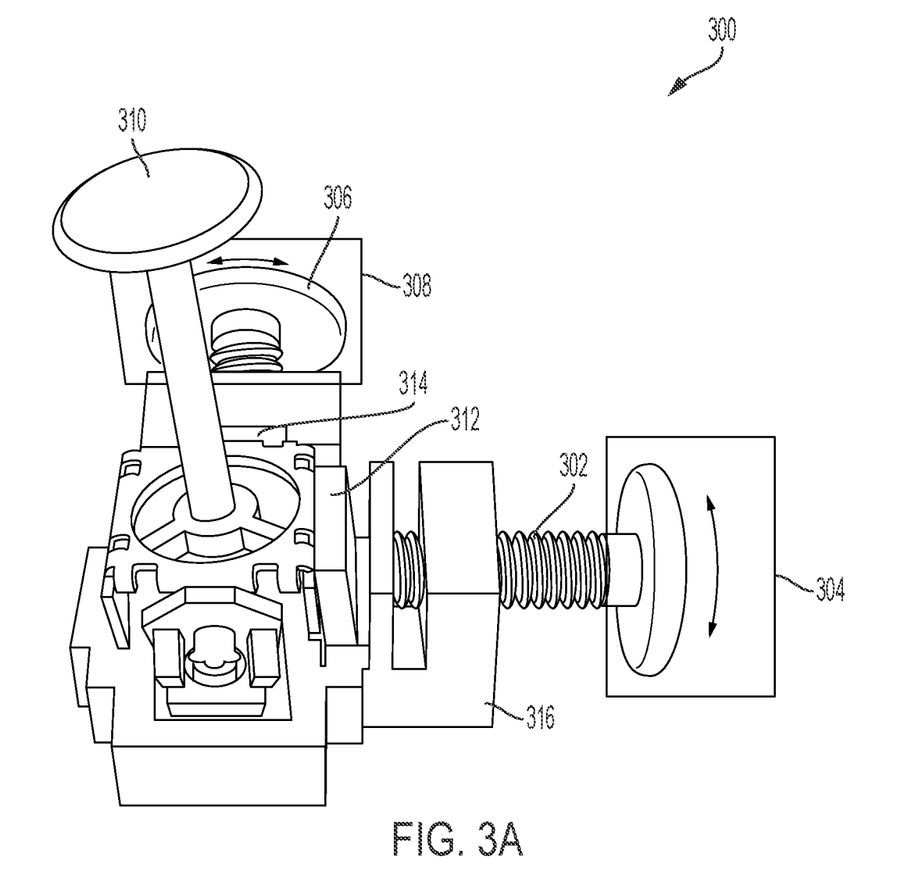
FIG. 3A is a perspective view of a two-axis input device including multiple motors for adjusting a friction of the two-axis input device, according to some embodiments of the disclosure.
Figure 3B:
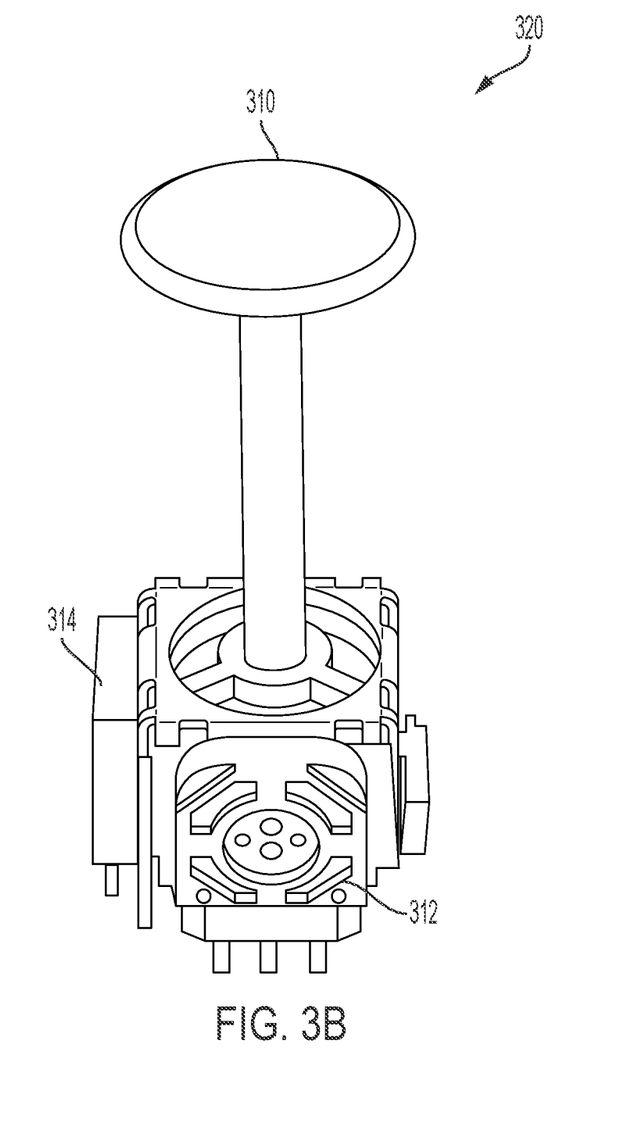
FIG. 3B is a perspective view of a two-axis input device including openings for friction adjustment according to some embodiments of the disclosure.

An example second view 320 of a two-axis input device, such as two-axis input device 300 of FIG. 3A, is shown in FIG. 3B. In FIG. 3B, the motors 304, 308 and pressure applicators 302, 306 are removed. As shown in FIG. 3B, access points 312, 314 may provide the pressure applicators with access to the two axes of the two-axis input device, allowing friction on the axes to be adjusted by an information handling system. Thus, a resistance of a two-axis input device, such as a joystick or a trackball, may be increased by increasing a friction on one or more axes of the two-axis input device.

Figure 4:
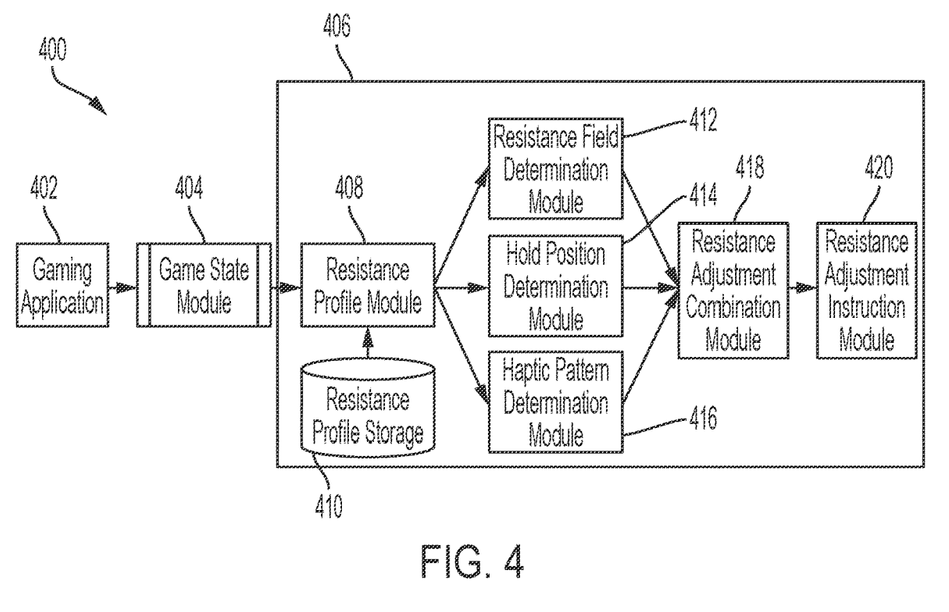
FIG. 4 is a block diagram of an example system for adjusting resistance of a two-axis input device according to some embodiments of the disclosure.

An information handling system may execute a system 400, shown in FIG. 4, for adjusting a resistance of a two-axis input device connected to the information handling system based on gaming context characteristics. At module 402, the information handling system may execute a gaming application. For example, a user may instruct the information handling system to execute a platforming game, a FPS game, a strategy game, a role playing game, an action game, or another type of game. Game state module 404 may receive or monitor data from the gaming application, such as audio, visual, and other data, to determine game state information of the gaming application, such as event information regarding events that occur in the gaming application, such as described in U.S. Pat. No. 11,141,658. In some embodiments, the information handling system may transmit gaming data from the gaming application 402 to a remote information handling system for determination of a game state, such as determination of gaming events.

The game state module 404 may provide the game state information and, in some embodiments, other gaming context characteristics such as an identity of the gaming application, a genre of the gaming application, and an identity of a user operating the information handling system, to a resistance profile module 408 of a resistance adjustment implementation module 406. The resistance profile module 408 may determine a resistance profile to be applied based on the gaming context information. For example, the resistance profile module 408 may determine whether a resistance profile stored in a resistance profile storage 410 should be applied based on a user identified by the gaming context information and/or a game state information received from the game state module 404. In some embodiments, for example, the resistance profile module 408 will determine that a resistance profile including a haptic pattern should be implemented based on one or more in game events specified by game state information received from the game state module 404, such as entry to a specific portion of an environment. For example, when a user is walking across rough in-game terrain or moving about during inclement in-game weather, the resistance profile module 408 may determine that a haptic pattern of the two-axis input device should be adjusted. In some embodiments, the resistance profile module 408 may access one or more resistance profiles specific to a user operating the information handling system based on an identity of the user, or specific to a game state information associated with a current game state of the gaming application based on the game state information. For example, resistance profiles specific to one or more users or game states, may be stored in a resistance profile storage 410, and the resistance profile module 408 may access one or more stored resistance profiles for a specific user and/or game state in determining adjustments to be made to a resistance of the two-axis input device. For example, a user, game developer, or other entity may create a resistance profile including specific two-axis input device resistance adjustments for a particular gaming application or genre gaming applications, and such a profile may be stored in resistance profile storage 410. When the resistance profile module 408 determines that a game matching a resistance profile in the resistance profile storage 410 is executed by an information handling system, the resistance profile for the game may be retrieved from the resistance profile storage 410. Game-specific resistance adjustments may include adjustments that increase a resistance when a two-axis input device is moved further from a starting position or adjustments that reduce a resistance when the two-axis input device is moved from a starting position, such that it is easier to move the two-axis input device on edges of the two-axis input device's movement range and more difficult to move the two-axis input device closer to the starting position. For example, for applications in a racing genre, resistance of a two-axis input device may be adjusted to reduce resistance close to a starting position and increase resistance further from the starting position, with tighter movement of the two-axis input device near an edge of a range of movement of the two-axis input device. As another example, for applications in a FPS genre, resistance of a two-axis input device may be adjusted to increase resistance close to a starting position to allow for enhanced aiming. As another example, for applications in a racing genre resistance of the two-axis input device may be adjusted to increase as game state information indicates that a speed of the user's in-game vehicle is increasing.

The resistance profile module 408 may provide the resistance profile information and gaming context characteristics, such as game state information, to a resistance field determination module 412 to determine adjustments to a variable resistance field profile of the two-axis input device. For example, the resistance field determination module 412 may compute one or more adjustments to make to the variable resistance field profile of the two-axis input device based on the received resistance profile information and other gaming context characteristics, such as game state information, from the resistance profile module 408, such as based on a stored resistance profile for a user and gaming context characteristics received from the game state module 404. As one example, a resistance profile may indicate that a resistance of a two-axis input device should be gradually increased as the two-axis input device is moved further from a default position when a particular type of gaming application, such as first-person shooter gaming applications, are executed by the information handling system. Based on received gaming context characteristics, the resistance field determination module may determine that a first-person shooter gaming application is executed by the information handling system. Based on this determination and based on the received resistance profile, the resistance field determination module may calculate a variable resistance field profile to be applied to the two-axis input device.

The resistance profile module 408 may further provide gaming context characteristics, such as game state information, a genre of a gaming application, and an identity of a gaming application, and a resistance profile to a hold position determination module 414. The hold position determination module 414 may calculate one or more hold positions for the two-axis input device.

The resistance profile module 408 may further provide gaming context characteristics, such as game state information, a genre of a gaming application, and an identity of a gaming application, and a resistance profile to a haptic pattern determination module 416. The haptic pattern determination module 416 may calculate one or more haptic patterns for application to the two-axis input device.

The resistance field determination, hold position determination, and haptic pattern determination modules 412, 414, 416 may provide resistance field, hold position, and haptic pattern adjustment information to a resistance adjustment combination module 418. The resistance adjustment combination module 418 may combine the adjustments to a variable field resistance, hold positions, and haptic patterns of the two-axis input device in a resistance adjustment combination for the two-axis input device. The resistance adjustment combination module 418 may provide the resistance adjustment combination to the resistance adjustment instruction module 420. The resistance adjustment instruction module 420 may transmit instructions to an input device, such as a gaming controller including one or more two-axis input devices, to adjust a resistance of the two-axis input device, such as a constant resistance of the two-axis input device, an axis-dependent resistance of the two-axis input device, and/or a position dependent resistance of the input device, based on the received resistance adjustment combination. In some embodiments, some or all of the modules of the resistance adjustment implementation module 406 may be executed by an information handling system other than the information handling system executing the gaming application 402, such as a remote cloud-based information handling system. In some embodiments, some or all of the modules of the resistance adjustment implementation module 406 and the game state module 404 may be executed by a rules engine, a complex event processing system, a machine learning model, or a reinforcement learning model executed by the information handling system.

Figure 5:
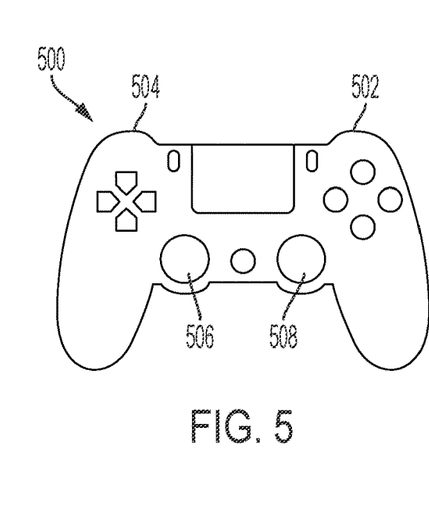
FIG. 5 is a diagram of an example gaming controller including multiple two-axis input devices, according to some embodiments of the disclosure.

An example gaming controller 500 for an information handling system is shown in FIG. 5. As shown in FIG. 5, the gaming controller 500 may include a first two-axis input device 506, such as a first joystick, and a second two-axis input device 508, such as a second joystick. In some embodiments, resistances of the two-axis input devices 506, 508 may be adjusted based on inputs received from a user via the gaming controller 500. For example, an information handling system may determine gaming context information related to a gaming application executed by the information handling system. The information handling system may determine that a gaming application executed by the information handling system is a first-person shooter game, and that when a user presses a left shoulder trigger 502, the gaming application enters an aiming mode, such as a mode for the user to aim down the sights of a weapon in the gaming application. Entry into an aiming mode may be an example of a game state information of the gaming application. Thus, when the information handling system receives input indicating that the user has pressed the left shoulder trigger 502, the information handling system may, based on the gaming context characteristics, such as the game state information and the genre of the gaming application, increase a resistance of the first two-axis input device 506 and/or the second two-axis input device 508. In some embodiments, the information handling system may adjust a resistance of one or both of the two-axis input devices 506, 508 based solely on the genre of the gaming application. For example, resistances of two-axis input devices 506, 508 may be increased when an information handling system determines that a user is playing a first-person shooter. A user may, for example, select resistance profiles for particular gaming applications. If a resistance profile has not been selected by the user for the gaming application, the information handling system may adjust resistance based on a genre-specific resistance adjustment profile.

Figure 6:
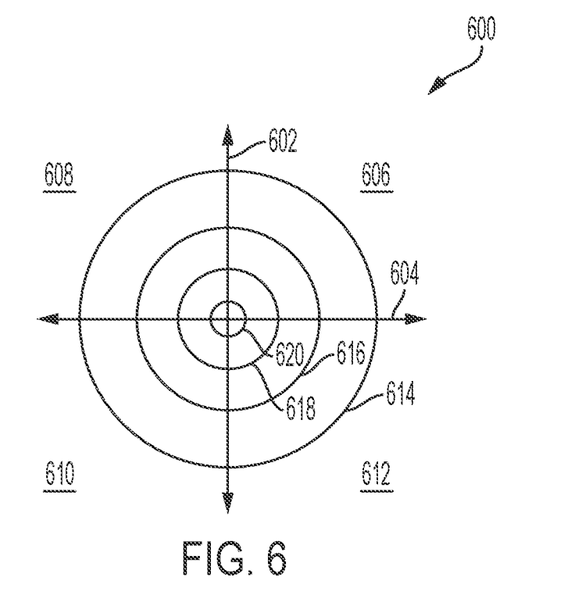
FIG. 6 is a graph of an example variable resistance field profile for a two-axis input device according to some embodiments of the disclosure.

Adjustments to resistance of a two-axis input device may include adjustments to a variable resistance field profile of a two-axis input device. An example graph 600 of a variable resistance field profile of a two-axis input device is shown in FIG. 6. The variable resistance field profile may be divided into a first quadrant 606, a second quadrant 608, a third quadrant 610, and a fourth quadrant 612. The first axis 604 may be a first axis of the two-axis input device, such as an x-axis, and the second axis 602 may be a second axis of the two-axis input device, such as a y-axis. The origin 620 of the two axes 602, 604 may be the default hold or starting position of the two-axis input device, such as the default position of a control stick of the two-axis input device. In some embodiments, adjustment to a variable resistance field profile of a two-axis input device may include increasing resistance of the two-axis input device as the device moves further from the origin position 620. For example, the resistance of the two-axis input device may be adjusted to increase at a constant or exponential rate as the device moves outward from the origin 620. Thus, at a first distance 618 from the origin 620, the two-axis input device may have a first level of resistance, at a second distance 616 from the origin 620, the two-axis input device may have a second level of resistance higher than the first level of resistance, and at a third distance 614 from the origin 620, the two-axis input device may have a third level of resistance, higher than the first or second levels of resistance. As another example, the hold position of the two-axis input device may be adjusted to rest at a position other than the origin 620. One or more stop positions may also be adjusted by adjusting the resistance of the two-axis input device. For example, the resistance of the two-axis input device may be adjusted to prevent a user from moving the two-axis input device further than distance 616 from the origin 620 when in a fourth quadrant 612 of the variable resistance field profile. As another example, the resistance of the two-axis input device may be adjusted to increase a resistance of a specific quadrant, such as a third quadrant 610. As another example, the resistance of the two-axis input device may be adjusted to only allow movement along a single axis, such as the first axis 604. Thus, adjustment of a variable resistance field profile of the two-axis input device may allow for a variety of resistance configurations.

Figure 7:
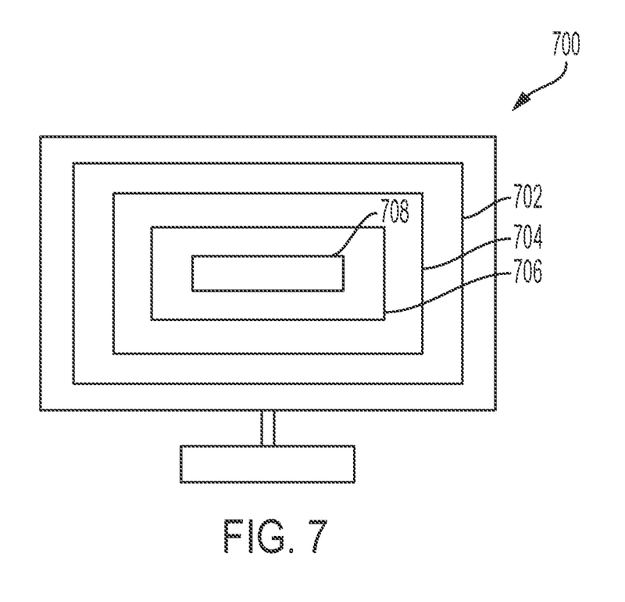
FIG. 7 is a diagram of an example display with multiple areas for adjustment of two-axis input device resistance according to some embodiments of the disclosure.

In some embodiments, a resistance of a two-axis input device may be adjusted based on a position of a cursor or aiming point on a display of the information handling system. An example display 700 is shown in FIG. 7. When a user is aiming within a first distance 708 of a center of the display, a resistance of the two-axis input device may be at a first, low, level. When a user is aiming at a second distance 706 from the center of the display, the resistance may be at a second level, higher than the first level. When a user is aiming at a third distance 704 from the center of the display, the resistance may be at a third level, higher than the second level. When a user is aiming at a fourth distance 702 from the center of the display 700, the resistance may be at a fourth level, higher than the third level. Alternatively, a resistance could decrease as the user aims further from the center of the screen. Thus, a resistance of a two-axis input device may be adjusted based on a position on a display at which a user is aiming in, for example, a first-person shooter game, and a position on a display at which a user is aiming in a gaming application may be an example of game state information.

Figure 8:
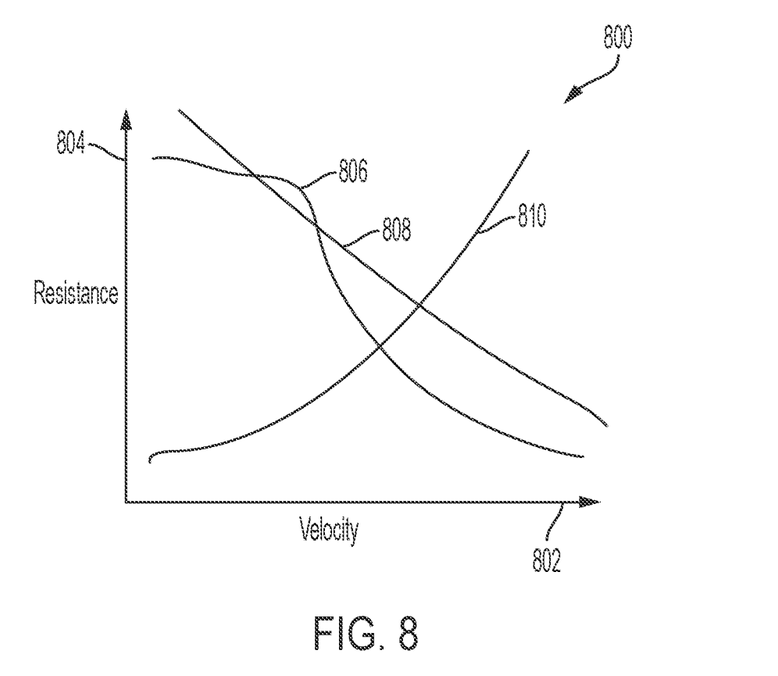
FIG. 8 is a graph of various resistance curves plotted against velocity of movement of a two-axis input device according to some embodiments of the disclosure.

In some embodiments, a resistance of a two-axis input device may be adjusted based on a velocity at which a user is adjusting a two-axis input device. An example graph 800 of velocity of input using a two-axis input device, along the x-axis 802, and resistance of the two-axis input device, along the y-axis 804 is shown in FIG. 8. A velocity of input using a two-input device may, for example, be a speed and direction in which a user spins a trackball or in which a user moves a joystick. In a first example resistance configuration 806, a resistance of a two-axis input device may decrease at a varying rate as the velocity of input increases. In a second example 808 resistance configuration 808, a resistance of a two-axis input device may decrease at a constant rate as the velocity of input increases. In a third example 810 a resistance of the two-axis input device may increase at a variable rate as the velocity of input increases. For example, complex force curves may be used to adjust resistance of the two-axis input device, such as based on input velocity. Thus, another example of a gaming characteristic based upon which a resistance of a two-axis input device may be adjusted is a velocity at which a user adjusts a position of the two-axis input device.

Figure 9:
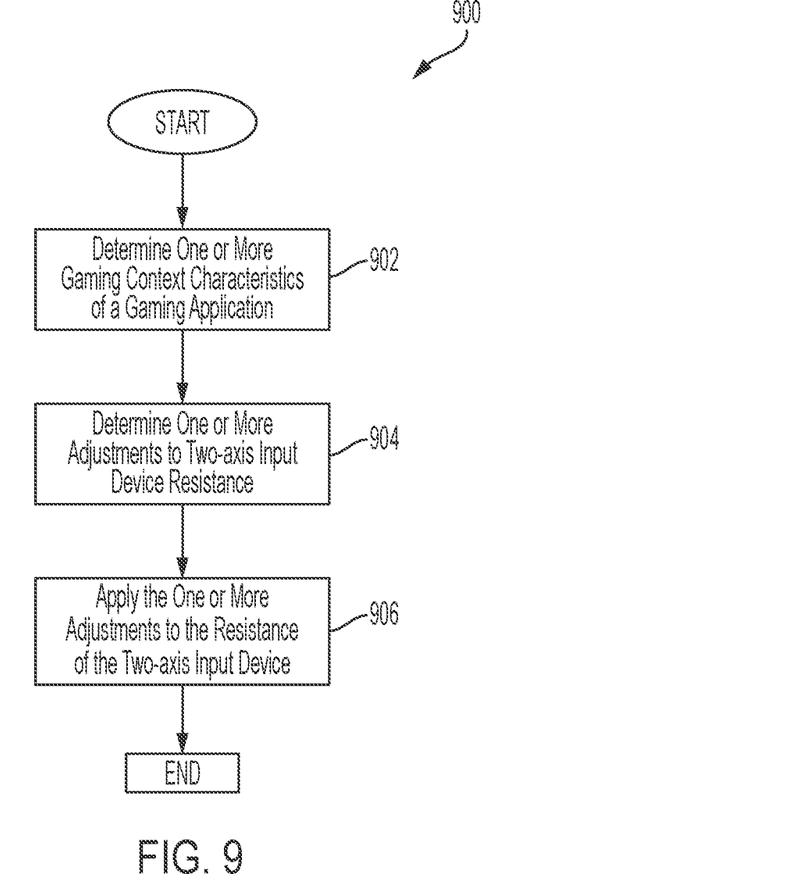
FIG. 9 is a flow chart of an example method for adjusting a resistance of a two-axis input device according to some embodiments of the disclosure.

An information handling system may perform a method 900 for adjusting a resistance of a two-axis input device based on gaming context characteristics, as shown in FIG. 9. At step 902, the information handling system may determine one or more gaming context characteristics of a gaming application. Gaming context characteristics may include an identity of the gaming application, a genre of the gaming application, a profile of a user operating the information handling system, or a game state information of the gaming application. A game state information of the gaming application may include one or more events that have occurred in or related to the gaming application, such as a user entering an aiming mode in a first person shooter, entering a specific area or level of the gaming application, moving a cursor or viewpoint of the gaming application to a particular area of a display of the information handling system, moving a two-axis input device a predetermined amount from a hold point, such as a starting or resting point, of the two-axis input device, other adjustments to the two-axis input device, equipping of a particular weapon in the gaming application, abilities or traits obtained in the gaming application, effects in the gaming application, a character state in the gaming application, a weapon/item state in the gaming application, cooldowns in the gaming application, terrain effects in the gaming application, a vehicle state in the gaming application, a user selection in the gaming application, one or more user attention vectors, attributes of in-game objects in the gaming application, a velocity at which a user enters input to the gaming application using the two-axis input device, a position of the display at which the user is aiming in the gaming application, and other game state information. In some embodiments, determination of the one or more gaming context characteristics may include receiving indications of the gaming context characteristics from a remote information handling system such as a cloud-based server. In some embodiments, determination of the one or more gaming context characteristics may include executing a machine learning model, a rules engine, a complex event processing system, and/or a reinforcement learning model to determine gaming context characteristics based on data generated by the gaming application and other data.

At step 904, the information handling system may determine one or more adjustments to a resistance of a two-axis input device based on the determined gaming context characteristics. For example, a gaming controller comprising one or more two-axis input devices, such as joysticks or trackballs, may be connected to the information handling system. Based on the determined gaming characteristics, the information handling system may determine one or more adjustments to make to a resistance of the two-axis input device. Adjustments to resistance may include increasing a friction of one or both axes of the two-axis input device or adjusting a tension of a spring, such as a centering spring, of the two-axis input device. Determination of adjustments to resistance may include determination of adjustments to one or more stop positions of the two-axis input device. Determination of adjustments to stop positions may, for example, include determination of points beyond which a two-axis input device will be prevented from moving, or points beyond which the resistance of the two-axis input device will increase substantially. For example, a particular point on a first axis of the two-axis input device may be set as a stop point and resistance at and beyond the particular point may be increased to a high level, such that movement of the two-axis input device is limited to an area before the stop-point on the first axis. Determination of adjustments to resistance of a two-axis input device may also include determination of adjustments to a variable resistance field profile of the two-axis input device. For example, different resistances may be set for different movements and/or different positions of movement of the two-axis input device. Determination of adjustments to resistance of a two-axis input device may also include determination of adjustments to position holds of the two-axis input device. For example, a start position may be adjusted to be different from a default resting position of the two-axis input device. Determination of adjustments to resistance of a two-axis input device may also include determination of adjustments to one or more haptic patterns of the two-axis input device. Such determinations may be performed by a rules engine executed by the information handling system, a complex event processing system executed by the information handling system, a machine learning model executed by the information handling system, and/or a reinforcement learning model executed by the information handling system. In some embodiments, determination of one or more adjustments to resistance of a two-axis input device may include receiving an indication of one or more adjustments to resistance of a two-axis input device from a remote information handling system, such as a cloud-based server.

As one example, determining adjustments of the resistance of the two-axis input device may include determining a range of movement the two-axis input device. For example, the two-axis input device may be adjusted to limit movement of the two-axis input device to movement along a particular axis, to within a particular distance of a holding point of the two-axis input device, or to within a particular area, such as a particular quadrant of movement of the two-axis input device. Such adjustments may include increasing a resistance of the two-axis input device to a high level outside of the allowed movement parameters. As one example, when the information handling system determines that a user has entered an aiming mode in a first-person shooter gaming application, such as a scoped in mode, the information handling system may determine to increase a resistance of the two-axis input device to provide fine-grained control for aiming to prevent overcompensation. As another example, when the information handling system determines that the user is approaching or at an edge of an in-game map or barrier, the information handling system may adjust a resistance of the two-axis input device to set a stop-point along an axis, such that a user moving the two-axis input device in a direction corresponding to the barrier or map edge will encounter high resistance. As another example, if the information handling system determines that the user is currently racing in a game, the information handling system may determine to increase a resistance of the two-axis input device to provide tighter steering using the two-axis input device. As another example, resistance of the two-axis input device may be adjusted to provide force feedback, such as by adjustments of haptic patterns of the two-axis input device, based on game state information of the gaming application. For example, resistance may be adjusted to provide force feedback when the information handling system determines that a user is flying in game, racing in game, moving a door or other object in game, or engaging in other in-game activities. As another example, resistance of the two-axis input device may be adjusted to enable user training. For example, the information handling system may determine an optimal direction of input, such as when aiming in a gaming application, and may increase resistance in all directions but the optimal direction of input, to aid the user in adjusting their aim in the gaming application.

At step 906, the information handling system may apply the one or more adjustments to the resistance of the two-axis input device. For example, the information handling system may transmit instructions to a controller comprising the two-axis input device to implement the one or more adjustments to the resistance of the two-axis input device. In some embodiments, such application may include transmitting an instruction to the two-axis input device to activate a motor, such as a step-up motor, servo motor, or other actuator, of the two-axis input device to adjust a tension of a spring of the two-axis input device, as described with respect to FIGS. 2A-C. In some embodiments, such application may include transmitting an instruction to the two-axis input device to activate one or more motors of the two-axis input device to increase a friction on one or more axes of the two-axis input device, as described with respect to FIGS. 3A-B. Thus, an information handling system may adjust a resistance of a two-axis input device based on received gaming context characteristics to enhance a user experience.

The flow chart diagram of FIG. 9 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for adjusting input resistance comprising:
determining, by an information handling system, one or more gaming context characteristics of a gaming application executed by the information handling system;
determining, by the information handling system, one or more adjustments to a resistance of a two-axis input device based, at least in part, on the one or more gaming context characteristics; and
applying, by the information handling system, the one or more adjustments to the resistance of the two-axis input device,
wherein the one or more adjustments to the resistance of the two-axis input device are indicated by a resistance profile stored by the information handling system, and
wherein applying the one or more adjustments to the resistance of the two-axis input device comprises activating a motor of the two-axis input device to adjust a tension on a spring of the two-axis input device.

2. The method of claim 1, wherein the one or more adjustments to a resistance of a two-axis input device comprise at least one of:
adjustments to one or more stop positions of the two-axis input device;
adjustments to a variable resistance field profile of the two-axis input device;
adjustments to one or more position holds of the two-axis input device; or
adjustments to one or more haptic patterns of the two-axis input device.

3. The method of claim 2, wherein adjustments to the variable resistance field profile of the two-axis input device comprise adjustments to the variable resistance field profile to include increasing a resistance of the two-axis input device as the two-axis input device is moved further from a hold position.

4. The method of claim 1, wherein the one or more gaming context characteristics comprise at least one of:
an identity of the gaming application;
a genre of the gaming application;
a profile of a user operating the information handling system; or
a game state information of the gaming application.

5. The method of claim 1, wherein the two-axis input device comprises at least one of a joystick or a trackball.

6. The method of claim 1, wherein determining the one or more gaming context characteristics comprises determining that the gaming application is a first person shooter gaming application and determining that a user of the information handling system has activated a trigger to activate an aiming function in the gaming application, and wherein determining the one or more adjustments to the resistance of the two-axis input device comprises determining to increase a resistance of the two-axis input device while the trigger is activated.

7. The apparatus of claim 1, wherein applying the one or more adjustments to the resistance of the two-axis input device further comprises activating the motor of the two-axis input device to adjust an internal friction of the two-axis input device.

8. An information handling system comprising:
a processor, and
a memory,
wherein the processor is configured to perform steps comprising:
   determining one or more gaming context characteristics of a gaming application executed by the information handling system;
   determining one or more adjustments to a resistance of a two-axis input device based, at least in part, on the one or more gaming context characteristics; and
   applying the one or more adjustments to the resistance of the two-axis input device,
   wherein the one or more adjustments to the resistance of the two-axis input device are indicated by a resistance profile stored in the memory, and
   wherein applying the one or more adjustments to the resistance of the two-axis input device comprises activating a motor of the two-axis input device to adjust a tension on a spring of the two-axis input device.

9. The information handling system of claim 8, wherein the one or more adjustments to a resistance of a two-axis input device comprise at least one of:
   adjustments to one or more stop positions of the two-axis input device;
   adjustments to a variable resistance field profile of the two-axis input device;
   adjustments to one or more position holds of the two-axis input device; or
   adjustments to one or more haptic patterns of the two-axis input device.

10. The information handling system of claim 9, wherein adjustments to the variable resistance field profile of the two-axis input device comprise adjustments to the variable resistance field profile to include increasing a resistance of the two-axis input device as the two-axis input device is moved further from a hold position.

11. The information handling system of claim 8, wherein the one or more gaming context characteristics comprise at least one of:
   an identity of the gaming application;
   a genre of the gaming application;
   a profile of a user operating the information handling system; or
   a game state information of the gaming application.

12. The information handling system of claim 8, wherein the two-axis input device comprises at least one of a joystick or a trackball.

13. The information handling system of claim 8, wherein determining the one or more gaming context characteristics comprises determining that the gaming application is a first person shooter gaming application and determining that a user of the information handling system has activated a trigger to activate an aiming function in the gaming application, and wherein determining the one or more adjustments to the resistance of the two-axis input device comprises determining to increase a resistance of the two-axis input device while the trigger is activated.

14. The information handling system of claim 8, wherein applying the one or more adjustments to the resistance of the two-axis input device further comprises activating the motor of the two-axis input device to adjust an internal friction of the two-axis input device.

15. A hand-held input device, comprising:
a two-axis input device,
wherein the two-axis input device comprises a centering spring and a motor for adjusting a resistance of the two-axis input device by adjusting a tension on the centering spring,
wherein the two-axis input device further comprises a gearbox coupled to the motor and a floor of the centering spring,
the motor adjusts the tension on the centering spring by raising and lowering the floor of the centering spring using the gearbox,
wherein the gearbox comprises a first gear connected to the motor and configured to rotate about a first axis and a second gear connected to the floor via a translational joint and configured to rotate about a second axis, and
wherein the first axis is parallel to the second axis.

16. The hand-held input device of claim 15, wherein the motor, when activated, adjusts the resistance of the two-axis input device based, at least in part, on a resistance profile.

17. The hand-held input device of claim 15, wherein the motor further adjusts the resistance of the two-axis input device by adjusting a friction applied to the two-axis input device.

18. The hand-held input device of claim 15, wherein the floor comprises a thread configured to rotate about the second axis.

* * * * *